US006849218B1

(12) United States Patent
De Winter et al.

(10) Patent No.: US 6,849,218 B1
(45) Date of Patent: Feb. 1, 2005

(54) METHOD FOR MANUFACTURING A MULTI-LAYERED MOLDED SYNTHETIC PART AND THUS OBTAINED PART

(75) Inventors: Hugo De Winter, Wetteren (BE); Yvan Vanluchene, Wetteren (BE); Hans Demandt, Overpelt (BE); Ivo Deblier, Overpelt (BE); Roger Hackwell, Billericay (GB)

(73) Assignee: Recticel, Brussels (BE)

( * ) Notice: Subject to any disclaimer, the term of this patent is extended or adjusted under 35 U.S.C. 154(b) by 0 days.

(21) Appl. No.: 09/807,938

(22) PCT Filed: Oct. 15, 1999

(86) PCT No.: PCT/BE99/00128
§ 371 (c)(1),
(2), (4) Date: Jul. 23, 2001

(87) PCT Pub. No.: WO00/23239
PCT Pub. Date: Apr. 27, 2000

(30) Foreign Application Priority Data

Oct. 21, 1998 (EP) .............................. 98870221

(51) Int. Cl.[7] .......................... B29C 45/14; B29C 41/18; B29C 41/20
(52) U.S. Cl. ....................... 264/240; 264/254; 264/255; 264/260; 264/308; 264/309
(58) Field of Search ................................ 264/240, 260, 264/250, 254, 255, 308, 309, 328.1, 328.2, 328.6; 428/304.4, 306.6, 318.4, 319.1, 319.3, 319.7, 319.9

(56) References Cited

U.S. PATENT DOCUMENTS 3,487,134 A 12/1969 Burr
5,116,557 A * 5/1992 Debaes et al. ............. 264/46.6
5,662,996 A * 9/1997 Jourquin et al. .......... 428/318.8
6,013,210 A * 1/2000 Gardner, Jr. ................ 264/40.1
6,210,614 B1 * 4/2001 Gardner et al. ............ 264/46.5
6,214,272 B1 * 4/2001 Gruenwald et al. ......... 264/255
6,235,228 B1 * 5/2001 Nicholl et al. .............. 264/255
6,352,658 B1 * 3/2002 Chang et al. .............. 264/46.4
6,419,863 B1 * 7/2002 Khac .......................... 264/46.6
6,444,303 B1 * 9/2002 Ali et al. .................. 428/318.8
6,544,449 B1 * 4/2003 Gardner ..................... 264/46.5

FOREIGN PATENT DOCUMENTS

| EP | 303 305 | 2/1989 |
| EP | 386 818 | 9/1990 |
| EP | 540 941 | 5/1993 |
| EP | 662 493 | 7/1995 |
| EP | 711 658 A2 | 11/1995 |
| WO | WO 93 23237 | 11/1993 |
| WO | WO 98 33634 | 8/1998 |

* cited by examiner

Primary Examiner—Angela Ortiz
(74) Attorney, Agent, or Firm—Sughrue Mion, PLLC

(57) ABSTRACT

The invention relates to a method for manufacturing a multi-layered molded synthetic part comprising a preformed elastomeric molded skin (5), a molded carrier (8) of a thermoplastic material and optionally an intermediate foam layer (6). In this method, the elastomeric skin (5) is molded in a first step and the thermoplastic material for the carrier (8) is subsequently molded in molten state to the back of said molded skin (5). According to the invention, the molded skin is made of a thermosetting synthetic material. Compared to a thermoplastic skin, such a thermosetting skin is less subjected to visible defects, in particular in case it has been provided with a superficial texture such as a leather grain, when the thermoplastic carrier is molded thereto. Molding of the thermoplastic carrier can be done by an injection molding, an injection pressure molding or a low pressure molding technique.

20 Claims, 6 Drawing Sheets

Figure 1:
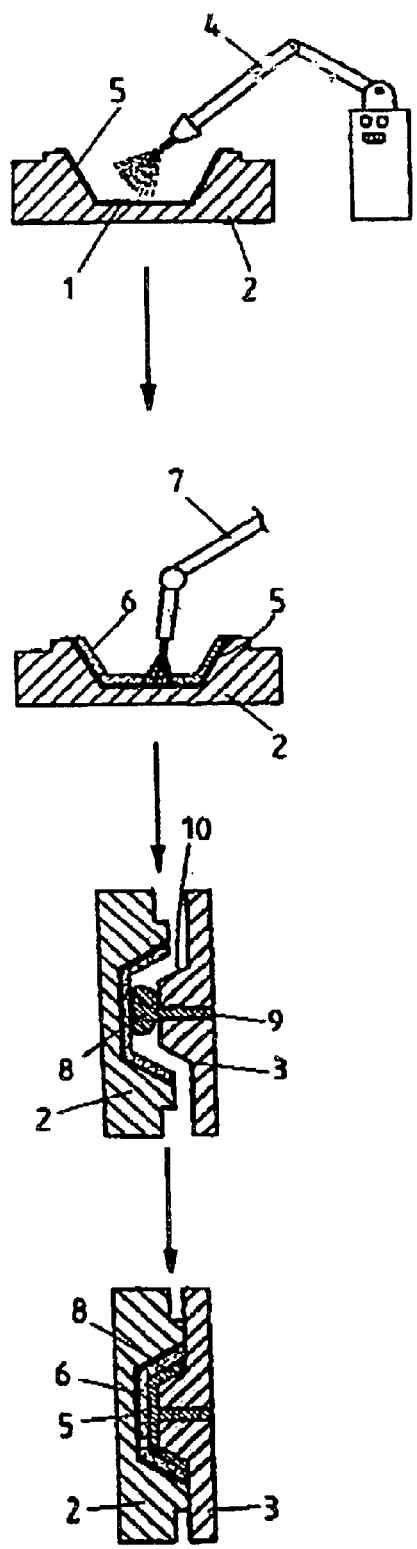

METHOD FOR MANUFACTURING A MULTI-LAYERED MOLDED SYNTHETIC PART AND THUS OBTAINED PART

The present invention relates to a method for manufacturing a multi-layered moulded synthetic part comprising at least a preformed elastomeric moulded skin and a moulded carrier of a thermoplastic material, which method comprises the steps of moulding said preformed elastomeric moulded skin, and moulding the thermoplastic material for the carrier in molten state to the back of said moulded skin.

Such a method is disclosed for example in EP-A-0 711 658. In the known method a PVC skin is first of all prepared by powder slush moulding in a first mould. This mould, which still carries the skin material on its moulding surface, is then inserted in an injection compression mould wherein a thermoplastic polypropylene carrier is injected. In order to achieve a sufficient adhesion between the PVC skin layer and the PP carrier, an adhesive layer, which may be formed by a foam layer, is applied against the back of the PVC skin prior to injecting the PP carrier.

A drawback of the method disclosed in EP-A-0 711 658 is that, due to the pressure and heat of the injected molten thermoplastic material, the front surface of the skin may be deformed or more particularly, in case the skin shows a grained surface, for example a leather grain, the superficial texture of the skin may be damaged or even lost. In case a reaction injection-moulding (RIM) process is used for moulding the rigid carrier, as disclosed for example in EP-B-0 642 411, considerably less heat and pressure are applied to the skin layer so that the afore-mentioned drawback does not arise. However, compared to the known thermoplastic carriers, a RIM moulded carrier, in particular a polyurethane carrier has to show a larger thickness in order to provide the required mechanical strength, is less suited to include design concepts for mechanical functions (clips, gear-wheels, etc.), and involves higher production costs.

In EP-A-0 711 658 the damaging effect of the injection moulding step to the superficial skin texture is avoided or reduced by transferring the skin together with the mould surface onto which it was produced to the injection mould. Such a technique imposes however limitations to the design of the synthetic parts and does in particular not allow to produce so-called undercuts. Indeed, undercuts require the use of slides in the mould in order that the moulded parts can be demoulded and thus cause visible parting lines on the outer side of a skin moulded against such a composite mould surface.

An object of the present invention is therefore to propose a new method for manufacturing multi-layered moulded synthetic parts which enables to reduce the damaging effect of the step of moulding the thermoplastic carrier to the back of the skin layer and which allows in particular to mould the skin layer in or against a first mould and to transfer it to another mould for moulding the thermoplastic carrier without damaging the superficial texture which is usually applied onto the visible side of the skin.

To this end, the method according to the invention is characterised in that said moulded skin is made of a thermosetting synthetic material, in particular a thermosetting polyurethane material.

It has been found that it is possible to mould a rigid thermoplastic carrier to the back of such thermosetting skin without damaging for example the leather grain texture which may have been provided on the visible side thereof, even when the skin has previously been transferred into another mould.

In an advantageous embodiment of the method according to the invention, the thermoplastic material for the carrier is moulded to the back of the skin according to an injection pressure moulding process in a mould which is only partially closed before the thermoplastic material is injected therein in molten state and which is further closed during and/or after the injection of the thermoplastic material so that a pressure is exerted by the mould onto the molten thermoplastic material or according to a low pressure moulding process in a mould wherein, before closing it, the thermoplastic material is laid down in molten state and, after having applied this thermoplastic material, the mould is closed so that a pressure is exerted by the mould onto the molten thermoplastic material.

In these embodiments, less pressure and/or heat is applied to the skin so that it will be less subjected to deformations, degradation, visible defects, etc.

In a preferred embodiment of the invention, the skin is moulded against a first mould surface and is transferred from this mould surface to a mould surface of the mould wherein the thermoplastic carrier is moulded.

This embodiment enables to produce skins or synthetic parts having complex shapes since, due to its flexibility, the skin can be removed easily from a complex mould surface showing in particular undercuts and can subsequently be positioned in a similar complex mould showing, however, the necessary slides to enable demoulding of the produced rigid synthetic part. On the parting lines of the slides, visible lines can be avoided by injecting the thermoplastic material at a sufficient low temperature and by closing the mould without generating a too high pressure therein.

In the present embodiment a grained skin can either be produced on the first mould surface or on the mould surface of the mould to which the skin is transferred and wherein the thermoplastic carrier is moulded. In the latter case, it has indeed been found that it is possible to apply a pressure and temperature to the skin when moulding the thermoplastic carrier which are sufficiently high to achieve the required deformation of the visible side of the skin but which are nevertheless still below the limits above which degradation of the skin or visible defects occur. For achieving the required pressure and temperature, preference is then given to an injection moulding process wherein the thermoplastic material for the carrier is moulded to the back of the skin in an injection mould wherein the thermoplastic material is injected in molten state after the mould has been closed.

In an alternative embodiment, the skin can also be moulded against a mould surface which is either already situated in the mould wherein the thermoplastic carrier is moulded or which is transferred thereto after having moulded the skin on this mould surface.

An important advantage of this embodiment is that the skin is automatically in an accurate position in the mould wherein the thermoplastic carrier is moulded since the skin remains perfectly positioned on the mould surface. A further important advantage is that the skin adheres somewhat to the mould surface, even in case a mould release agent has first been applied thereto, so that it will not be locally stretched or elongated in the mould for forming the carrier when the thermoplastic material is injected therein through several injection gates or in other words so that there is no risk that bubbles will be formed.

The present invention further also relates to a multi-layered moulded synthetic part which is made in particular by the method according to the invention and which comprises at least a preformed elastomeric moulded skin and a carrier of a thermoplastic material which is moulded in molten state to the back of said skin layer. The synthetic part according to the invention is characterised in that the moulded skin is made of a thermosetting synthetic material, in particular a polyurethane material.

Further particularities and advantages of the method and the synthetic parts according to the invention will become apparent from the following description of some particular embodiments of the invention. This description is only given by way of example and is not intended to limit the scope of the invention. The reference numerals used hereinafter relate to the annexed drawings wherein:

FIG. 1 shows a schematic representation of the different steps of a first embodiment of the method according to the invention; and FIGS. 2 to 7 show schematically the different steps of a second embodiment of the method according to the invention.

In these different figures, the same reference numerals relate to the same or to analogous elements.

The invention generally relates to a method for manufacturing a multi-layered moulded synthetic part comprising at least a preformed elastomeric moulded skin and a moulded carrier of a thermoplastic material. Such multi-layered synthetic parts, in particular self-supporting trim parts are especially used as car interior parts such as dashboards, door panels, consoles, glove compartments, etc.

In the method according to the invention the preformed moulded skin is applied in a mould, the thermoplastic material for the carrier is applied in molten state to the back of the skin in the mould and is allowed to harden, and the obtained part is removed from the mould.

Applying the preformed moulded skin in the mould for moulding the thermoplastic carrier can be done in two ways. First of all it is possible to mould the skin against a mould surface which is either situated already in the mould for moulding the carrier or which is transferred thereto together with the skin moulded thereon (see FIG. 1). On the other hand, the skin can be moulded against a first mould surface and subsequently transferred from this first mould surface onto a mould surface of the mould for making the carrier (see FIGS. 2–4).

When moulding the thermoplastic carrier in molten state in the mould, the skin layer is subjected to an amount of heat and pressure. In order to avoid or reduce visible defects to the skin as a result of this heat and pressure, use is made in the method according to the invention of a skin made of a thermosetting material, in particular a polyurethane material.

By the expression "thermosetting material" is meant a material which, in contrast to a thermoplastic material, cannot be molten to such an extend that it is possible to pour or inject it in molten state in a mould to make a moulded part thereof. However, it does not mean that it cannot be molten to an extend which is sufficient to alter the superficial texture of a part made thereof. In general, when moulding the intended "thermosetting materials" they require further chemical reactions or curing to solidify.

For moulding the thermosetting, in particular elastomeric polyurethane skins, different techniques can be used. The skin may for example be made by a RIM (reaction injection moulding) process. In this process, two or more reaction components, especially a polyol and a isocyanate component are injected in a closed mould, and the reaction mixture is allowed to cure to produce the polyurethane skin. On the other hand, the skin can also be moulded against a mould surface by a spray technique, for example by the technique described in EP-B-0 303 305. Suitable reaction mixtures for making the skin by the RIM or spray process are disclosed for example in EP-B-0 379 246. The reaction mixtures disclosed herein are light-stable PU reaction mixtures based on aliphatic polyisocyanates. Although preference is given to such aliphatic polyisocyanates, it is however also possible to use aromatic isocyanates for producing the skin. In this case, the skin is preferably covered with a paint to protect it against the light. Further, the thermosetting skin can also be made according to a powder or liquid slush moulding process wherein the mould surface is heated so that a final reaction or curing of the material is obtained. All of the above moulding processes offer the advantage that small design radii are possible namely as low as 0.5 mm in case of a leather grain or even sharp edges in case the skin shows no superficial texture whilst for the usual thermoformed skins, a curvature radius of 2 mm is already a problem.

The thermoplastic rigid carrier can be made of the various existing thermoplastic materials which are suited for providing a rigid support including especially polypropylene (PP), polycarbonate (PC), acryinitril-butadiene-styrol (ABS), ABS blends, acrylester-styrol-acryinitril (ASA), polystyrol (PS), thermoplastic polyurethane (TPU) or mixtures thereof or mixtures of any of these components with still other thermoplastic materials. According to the present invention, preference is given to PC, ABS and ABS blends and especially to ABS and ABS blends, in particular PC/ABS and ABS/PA (polyamide). For ABS and ABS blends, it has indeed been found that a good adhesion is directly obtained between the PU skin and the carrier without having to us any primer, glue, adhesion, etc. However, also when the carrier is made for example of PP, the necessary adhesion can be obtained by using an appropriate primer or an adhesive layer applied between the skin and the carrier. Such adhesive layers are for example disclosed in EP-A-0 711 658, the composition of which is incorporated herein by way of reference. In addition to a chemical adhesion, it is further especially also possible to obtain a mechanical anchoring. It is for example possible to apply a foam backing layer against the back of the skin before moulding the thermoplastic carrier. In this way, the molten material of the carrier can partially penetrate in the foam layer so that a mechanical anchoring effect is obtained.

Another way which may be considered for enhancing the adhesion between the skin and the carrier consists in admixing small particles or fibres of the thermoplastic carrier material into the reaction mixture for making the skin. A number of these particles or fibres will be situated on the interface between skin and carrier and may thus provide the necessary adherence between these two layers. The particles incorporated in the skin have for example a diameter of 5 to 1500 $\mu$m and in particular of 20 to 300 $\mu$m whilst the fibres have for example a length of at least 4 mm and preferably a length of 12 to 100 mm.

This technique may especially be suited for adhering a PP carrier, or a thermoplastic intermediate foam layer, to a PU skin.

Hereafter, the technique for manufacturing the multi-layered synthetic part will be described more into detail with reference to the figures.

FIG. 1 shows schematically a first embodiment of the method according to the invention.

On the mould surface 1 of a first mould part 2, which is arranged horizontally, there is applied, by spraying by means of a spray gun 4, a polyurethane elastomeric layer 5 which forms the skin 5 of the synthetic part. As mentioned already hereabove, this can be done according to the technique described in European patent No. 0 303 305 of one of the present applicants.

In a second step, a reaction mixture for obtaining a polyurethane foam layer 6 is sprayed by means of a second spray gun 7 against the back of the polyurethane skin 5, preferably when the skin 5 is still somewhat sticky.

Then, in a third step, the mould part 2 is transferred to an injection pressure mould wherein the mould part 2 is arranged substantially vertically and wherein it cooperates with a second mould part 3 to form the mould cavity. The mould 2, 3 is partially closed and a suitable thermoplastic material for obtaining the rigid synthetic carrier 8 is injected under pressure into the mould cavity through one or more injection gates 9. Subsequently, the mould 2, 3 is entirely closed in order to divide the thermoplastic material homogeneously over the entire mould cavity.

For producing the polyurethane skin 5 a light-stable, mass-stained coloured polyurethane reaction mixture is sprayed in the first embodiment, as shown in FIG. 1, against the mould surface 1. Such reaction mixtures are for example disclosed in European patent No. 0 379 246 of one of the present applicants. These light-stable reaction mixtures are based on an aliphatic polyisocyanate. It is also possible to use reaction mixtures based on aromatic isocyanates, preference being however given to aliphatic isocyanates in view of the higher (light) stability thereof.

In a variant embodiment, a light-stable coloured polyurethane paint or in other words a so-called PU inmold paint, is applied first, in the first step, onto the mould surface. This paint composes together with the elastomeric layer subsequently applied thereto, the polyurethane skin 5. In this embodiment, use can be made without problems of an aromatic polyurethane system for the elastomeric layer since the elastomeric skin is in this way protected from the light.

The polyurethane skins are usually manufactured against a mould surface, the surface structure of which is provided with a superficial texture for giving the skins in particular the look of natural leather. The polyurethane foam 6 which is applied against the back of these skins 5, and which is preferably an open cell foam, provides for a so-called soft touch. The reaction mixture for obtaining the polyurethane foam layer 6 is preferably composed in such a manner that a semi-flexible polyurethane foam is obtained. Especially the amount of so-called cross-linkers in the reaction mixture is important in this respect. In a particular embodiment, use is made in this reaction mixture substantially exclusively of water as blowing agent. The polyisocyanate component is for example based on MDI.

In a preferred embodiment, an open-cell polyurethane foam layer 6 having a thickness of 0.1 to 30 mm and preferably of 2 to 3 mm is applied. In order to approach as much as possible the touch of natural leather, such a foam layer 6 is combined with a polyurethane skin 5 having a thickness of 0.1 to 10 mm and preferably of 0.5 to 1.5 mm. Instead of applying a real foam backing layer 6, this layer could also be made of an elastomeric layer which is softer than the outer elastomeric skin layer in order to produce the desired soft-touch effect. The backing layer could alternatively also be prepared in advance and glued or otherwise adhered to the back of the skin layer. Also other techniques, such as for example RIM techniques or even liquid or powder slush moulding techniques could be employed for providing the soft or foam backing layer against the thermosetting skin layer. In contrast to the outer skin layer, these backing layers can, according to the invention, be made of a thermoplastic material. This offers the advantage that the thermoplastic carrier may show a stronger adherence to such thermoplastic backing layers than for example to a PU layer, especially in case the carrier is made of PP or another polyolefin.

In order to finish the trim part further on the back or inner side, a skin layer may also be applied against the mould surface 10 of the second mould part 3 in the first step.

In a first embodiment, a polyurethane paint is sprayed against the mould surface 10, either or not followed by the application of an elastomeric skin layer and a further polyurethane foam layer. In the latter case, a leather like coating is also obtained on the back.

Instead of the combination of the polyurethane paint layer and the elastomeric layer, it is of course also possible to use an elastomeric skin layer as such, in particular a light-stable polyurethane skin layer.

For moulding the thermoplastic carrier at the back of the skin, different moulding techniques can be used.

As mentioned already hereabove, the thermoplastic material for the carrier can be injected in the mould 2,3 when this mould is only partially closed. The mould 2,3 is then further closed when the thermoplastic material is being injected in the mould and/or when it has already been injected. In this embodiment, the carrier is in other words produced according to a so-called injection pressure moulding process. When injecting the thermoplastic material the mould parts may be separated in particular about 1 to 30 mm ("Hinterpragen") or even completely open ("Hinterpressen").

In the method according to the invention, the mould parts are preferably separated less than 10 mm when injecting the thermoplastic material. An important advantage of this technique is that the large pressure at which the molten material is injected does not act directly onto the skin material but is considerably reduced due the fact that this pressure can escape laterally in the mould cavity.

It has been found that, in this way, the injection pressure has no or nearly no influence on the skin properties but that especially the pressure exerted when closing the mould 2,3 may be important and also the time period within which the mould is closed. The pressure exerted on the molten thermoplastic material is more particularly preferably situated between 1 and 350 kg/cm$^2$ and more preferably between 10 and 80 kg/cm$^2$ whilst the mould is preferably closed within a closing time shorter than 15 seconds and most preferably within 2 to 6 seconds. In the first phase after having injected the thermoplastic material, the mould is preferably closed as quickly as possible since, in a second phase, the other material becomes already more viscous so that the mould has to be closed slower to avoid too high pressures in the mould. In order to maintain the pressure within the above limits, the force at which the mould is closed can be controlled. Further, the pressure can be reduced by making thicker carriers and by using more injection gates so that less pressure has to be exerted for distributing the molten material over the skin layer when closing the mould. Finally, the chemical composition of the thermoplastic material can be chosen in order to reduce the viscosity of the molten material and in this way thus also the pressure required for distributing this material over the skin layer.

Another technique which can be used is the so-called low pressure moulding technique. In a low pressure moulding process, the molten thermoplastic material is laid down or deposited in the pressure mould in the form of a slice when this mould is still open. In contrast to the injection pressure moulding technique or the injection moulding technique set forth hereafter, the mould is preferably arranged with the one mould halve situated on top of the other so that the mould is opened or closed according to a substantially vertical movement. The thermoplastic material can either be laid down onto the back of the skin layer or onto the opposite mould part. This latter embodiment offers the advantage that the thermal effects on the skin are smaller. The thermoplastic material is preferably laid down onto the lower mould halve whilst the skin is arranged against the surface of the upper mould halve. After having laid down the thermoplastic material, the mould is closed so that a pressure is exerted on the molten thermoplastic material in order to spread it over the back of the skin. In this embodiment also, the same preferred pressures and closing times as set forth hereabove for the injection pressure moulding technique are applicable as well as the different measures for reducing the pressure required for distributing the molten thermoplastic material over the skin layer. In this embodiment, an increased number of injection gates corresponds of course to a better initial spreading of the molten material, i.e. by using thinner slices, when depositing a bead of this material in the mould.

A third technique which can be used for moulding the thermoplastic carrier is the so-called injection moulding technique. In this technique the thermoplastic material is injected in molten state in an injection mould after having closed this mould. In this embodiment higher pressures and temperatures are exerted on the skin layer but it has been observed that even in this case these pressures and temperatures can be kept below the limits at which skin degradation may occur. In case the skin is not transferred to another mould surface, there is further also no or nearly no detrimental effect on any superficial texture of the skin layer.

However, in some cases, in particular in case of parts showing undercuts, it may appear to be necessary to make the skin in one mould and to transfer it to another mould for making the thermoplastic carrier. In case a grained skin is to be made, preference is given with the first two techniques, i.e. with the injection pressure moulding technique and the low pressure moulding technique, to a process wherein the grain texture is provided in the mould surface against which the skin is moulded, the mould surface of the mould wherein the carrier is moulded being then preferably free of any superficial texture. In this way, no signs of an additional grain structure can be formed on the skin surface.

In an injection moulding process, the original skin texture may however quite easily be damaged in the injection mould. In this case, the skin is preferably first produced without any superficial textures. If desired, a superficial texture is then obtained in the mould wherein the carrier is injection moulded by providing the injection mould with the necessary texture. It has been found that, notwithstanding the fact that the skin is made of a thermosetting material, the texture on the mould surface can be transferred to the skin by applying sufficient heat and pressure thereto. An injection moulding process is especially suited herefor. In case the injected molten material would exert locally a too high pressure onto the skin layer, it is also in this embodiment possible to use several injection gates. Moreover, in this embodiment it appeared to be advantageous to inject the thermoplastic material through injection gates situated in the mould part against which the skin layer is positioned. In this way, the thermoplastic material is injected against the opposite mould part and thus not directly against the skin layer.

The parts produced in accordance with the method according to the present invention can easily be recognised form the parts which are actually on the market and which consist of a moulded PU skin and a moulded carrier which are fixed to one another by moulding a PU foam layer between the skin and the carrier. Indeed, due to the fact that the thermoplastic carrier is moulded either directly against the elastomeric skin layer or against and intermediate foam layer, it shows a much coarser surface on its side directed towards the skin compared to its back which is moulded against the mould surface.

EXAMPLE 1

The method according to this example is in particular suited for manufacturing a door trim having a surface of for example 10 dm$^2$. The model of this door trim included no undercuts so that only one two-part mould, analogous to the one indicated in FIG. 1, had to be used for the whole process. The mould part 2 of this mould comprised a galvanoplate showing a leather structure.

In a preparatory step, the mould part 2 was treated with a mould release agent such as for example Acmosil 180 SFC (Acmos) or Aquathan 61-360 (Block Chemie).

On the mould part 2 a polyurethane skin 5 was produced by means of a two-component spray gun 4. For manufacturing this skin 5 use was made of the Colofast® Spray system (trademark of Recticel) which allowed to produce a mass-stained light-stable microcellular elastomeric skin. The first component of this system, i.e. Isofast 3430 A (Recticel), was supplied at a flow rate of 3.67 g/sec, whereas the second component, i.e. Polyfast 3530 A (Recticel), was supplied at a flow rate of 6.33 g/sec. The total flow rate comprised therefore 10.0 g/sec. The controlled spray time comprised 10 sec. In this way a polyurethane skin 5 was obtained having a thickness of about 1 mm.

Immediately after the reaction, a layer of about 2 mm semi-flexible open-cell polyurethane foam 6 was applied on top of this polyurethane skin 5 by means of a second two-component spray gun 7. For producing this foam layer 6 use was made of the following waterblown MDI system:

| Polyol component: | |
| --- | --- |
| Specflex NM 805 (Dow) | 100 |
| Butanediol 1,4 (Huls) | 3 |
| Water | 0.9 |
| Dabco 33 Lv (Air Products) | 1.0 |
| Fomrez UL28 (Witco) | 0.05 |
| Total | 104.95 |
| Isocyanate component: | |
| Suprasec VM12 (I.C.I.) | 24.12 |
| Isocyanate index: | 60 |
| Flow rate of polyol component: | 4.88 g/sec |
| Flow rate of isocyanate component: | 1.12 g/sec |
| Total flow rate: | 6.00 g/sec. |

After a controlled spray time of 10 sec. with the spray gun 7, a thin layer of semi-flexible open-cell foam provided with a natural skin towards the side of the gun was obtained having a total thickness of ±2 mm and the so-called overall density of which comprised ±450 gr/liter.

By adjusting the robot program the thickness of the semi-flexible layer may vary from place to place. This thin foam layer gives the elastomeric "Colofast" skin, a so-called soft touch specific to natural leather.

After having produced the skin 5 and foam layer 6 onto the mould part 2, this mould part 2 was transferred to an injection pressure mould wherein it cooperated with a second mould part 3 to form the mould cavity for producing the rigid carrier 8. Before injecting the thermoplastic material for the carrier 8, the mould 2,3 was partially closed so that an opening of 8 mm remained between both mould halves 2,3. An ABS/PC blend was then injected through four injection gates 9 into the mould 2,3. This ABS/PC blend consisted of Bayblend T64 (Bayer) and was heated to a temperature of 260° C. whilst the mould was heated to a temperature of 30° C. The ABS/PC blend was injected within an injection time of 4 seconds and entered the mould cavity at a pressure of about 70 to 90 bars. After having injected the thermoplastic material, the mould 2, 3 was immediately closed, at a constant speed, within a closing time of 2 seconds. Subsequently, a back pressure of 10 bars was maintained for 5 seconds after which the pressure was removed. After a cooling time of 35 seconds, the produced part was demoulded. The so-obtained multi-layered moulded part had an average thickness of about 6 mm. No visible defects were caused by the injection pressure moulding step to the outer surface of the skin layer 5. The adherence of the skin and foam layer to the rigid carrier was good without having to use any adhesive or primer.

EXAMPLE 2

This example is identical to Example 1 except for the fact that the "Colofast" polyurethane skin was replaced by a so-called polyurethane inmold paint followed by a two-component aromatic microcellular elastomeric system.

The inmold paint was in this case a light-stable two-component PU system, in particular Isothan-IMP-2K-Klarlack ME 170 of ISL Chemie.

Some inmold paints such as for example Rimbond 200 of Mc. Pherson Industrial Coatings have self release properties, so that the amount of a mould release agent on the mould part 2 could be reduced or avoided. The thickness of the inmold paint film comprised ±20 μ.

After evaporation of the solvent, which took about 30 sec., the second layer, a PU elastomer, was applied by means of a two-component gun. This solventless elastomeric system consisted of

| | |
|---|---|
| 1. Polyol-component | |
| Polyethertriol: condensate of propylene en ethylene oxyde on glycerine - IOH index 28 - content of primary OH groeps 85% | 90 |
| Dabco 33 Lv (Air Products) | 2.25 |
| Butanediol (Huls) | 7.9 |
| Color paste | 5 |
| | 105.15 |
| Viscosity at 25° C. in mPa.s | 1060 |
| Viscosity at 45° C. in mPa.s | 320 |
| 2. ISO-component | |
| Isocyanate RMA 200 (Dow) | 43.5 |
| Viscosity at 25° C. in mPa.s | 620 |
| Viscosity at 45° C. in mPa.s | 126 |

This system was based on aromatic isocyanates and was therefore not light-stable or coloured. These lacking properties were obtained by the previously applied PU inmold paint. In this way, there was also obtained a light-stable coloured 100% PU skin. Also in this case, no visible defects were caused by the injection pressure step to the visible side of the skin.

EXAMPLE 3

Example 1 was repeated without spraying the foam layer 6 against the back of the skin layer 5. Use was further made of Stapron CM404 (DSM) as thermoplastic material for the carrier 8. This material was injected at 270° C. at an injection pressure, at the entry of the mould cavity, of about 80 bar. The further parameters were identical to Example 1. The total moulding cycle comprised 55 seconds. Also in this example, a multi-layered part was produced which showed no visible defects on the visible side of the skin layer and wherein the skin layer adhered strongly to the carrier without having to use any adhesive or primer.

EXAMPLE 4

In the example a door trim part was manufactured consisting of a polyurethane skin 5, a semi-rigid polyurethane foam layer 6 and a rigid carrier 8. The different steps are shown in FIGS. 2 to 7.

Figure 2:
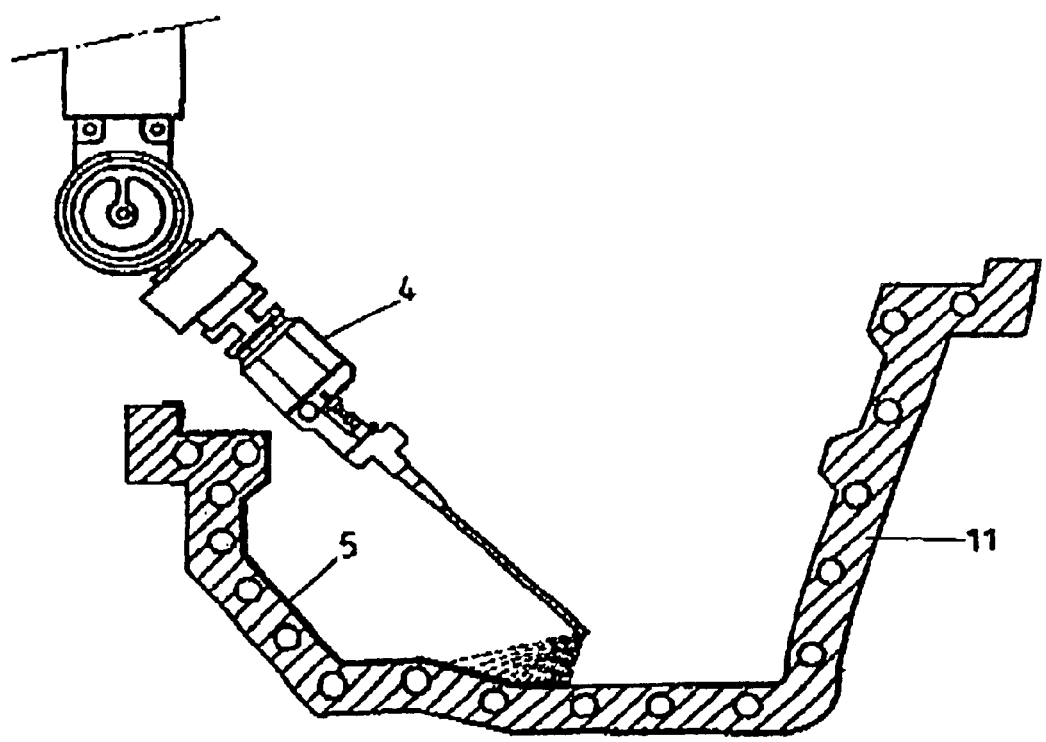
Figure 3:
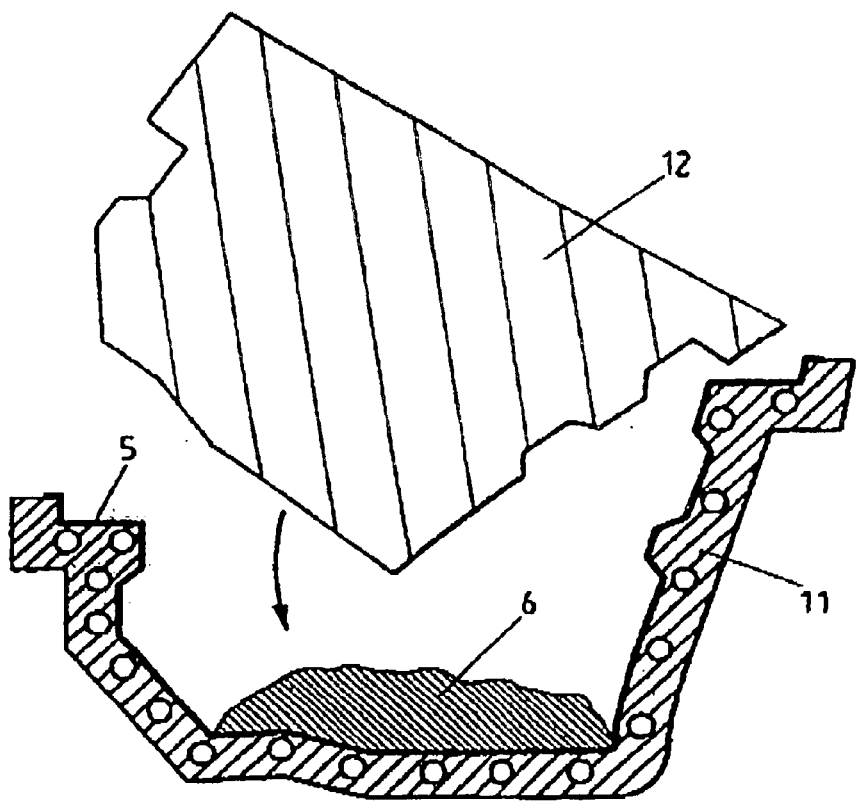
Figure 4:
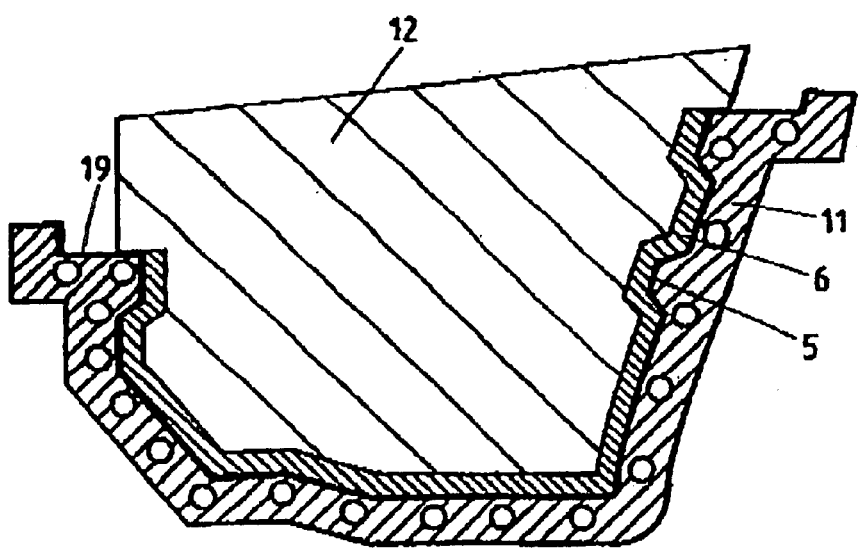

In the first step, illustrated in FIG. 2, a polyurethane skin 5 (of about 1 mm) was made in the same way and by means of the same materials as in example 1 by spraying with a spray gun 4 against one part 11 of a mould 11, 12. This mould part 11 was provided with a leather texture. In a second step, a semi-rigid foam was applied in the open mould 11, 12 on the back of the skin 5 (see FIG. 3) by means of a two component mixing head (not shown) and the mould 11, 12 was closed to produce the foam layer 6 having a thickness of about 4 min. (see FIG. 4). The foam was a polyurethane foam made from 100 parts of Bayfil VP PU 0811D (Bayer) as polyol component and 36 parts of Desmodur 44 V20LF (Bayer) as isocyanate component. These components had a temperature of 25° C. and were passed through the mixing head at a total flow rate of 150 g/sec. The curing time of the foam comprised 250 seconds.

Figure 5:
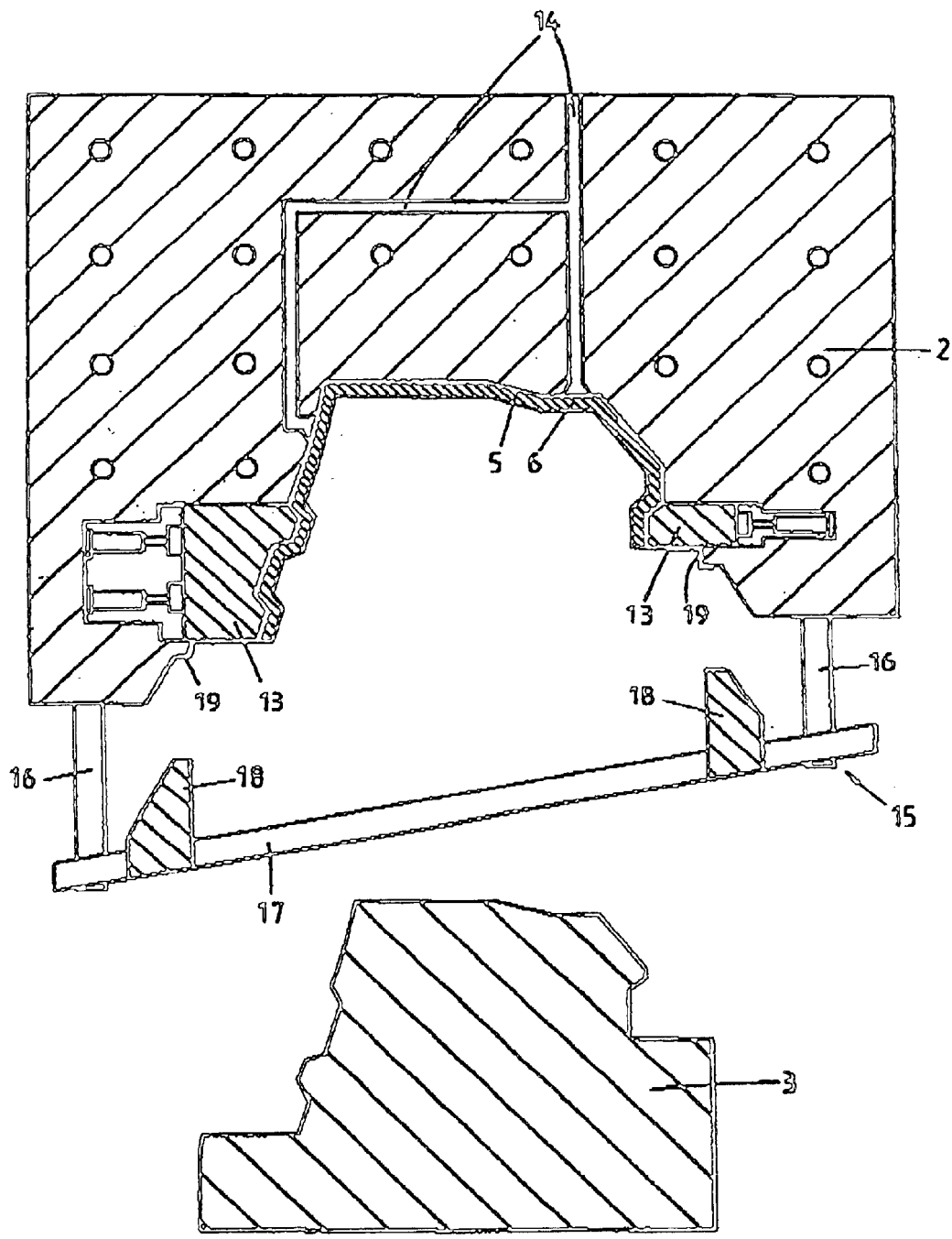

In a third step, illustrated in FIG. 5, the laminate of the PU skin 5 and PU foam layer 6 was transferred into a low pressure mould 2, 3, and was more particularly positioned against the upper mould part 2 thereof. This upper mould part 2 was provided with the necessary slides 13 to enable undercuts in the moulded part. For accurately positioning the skin against the mould part 2, this mould part 2 was provided with vacuum channels 14 connected to a source of vacuum. Further, a clamping frame 15 was provided consisting of rods 16 fixed to the mould part 2 and of the actual frame 17 which was slideably mounted on the rods 16 and which carried clamps 18. These clamps 18 were used to clamp an edge portion 19 of the laminate 5, 6, which was not provided with a foam backing 6, against the upper mould part 2 as shown in FIG. 6.

Figure 6:
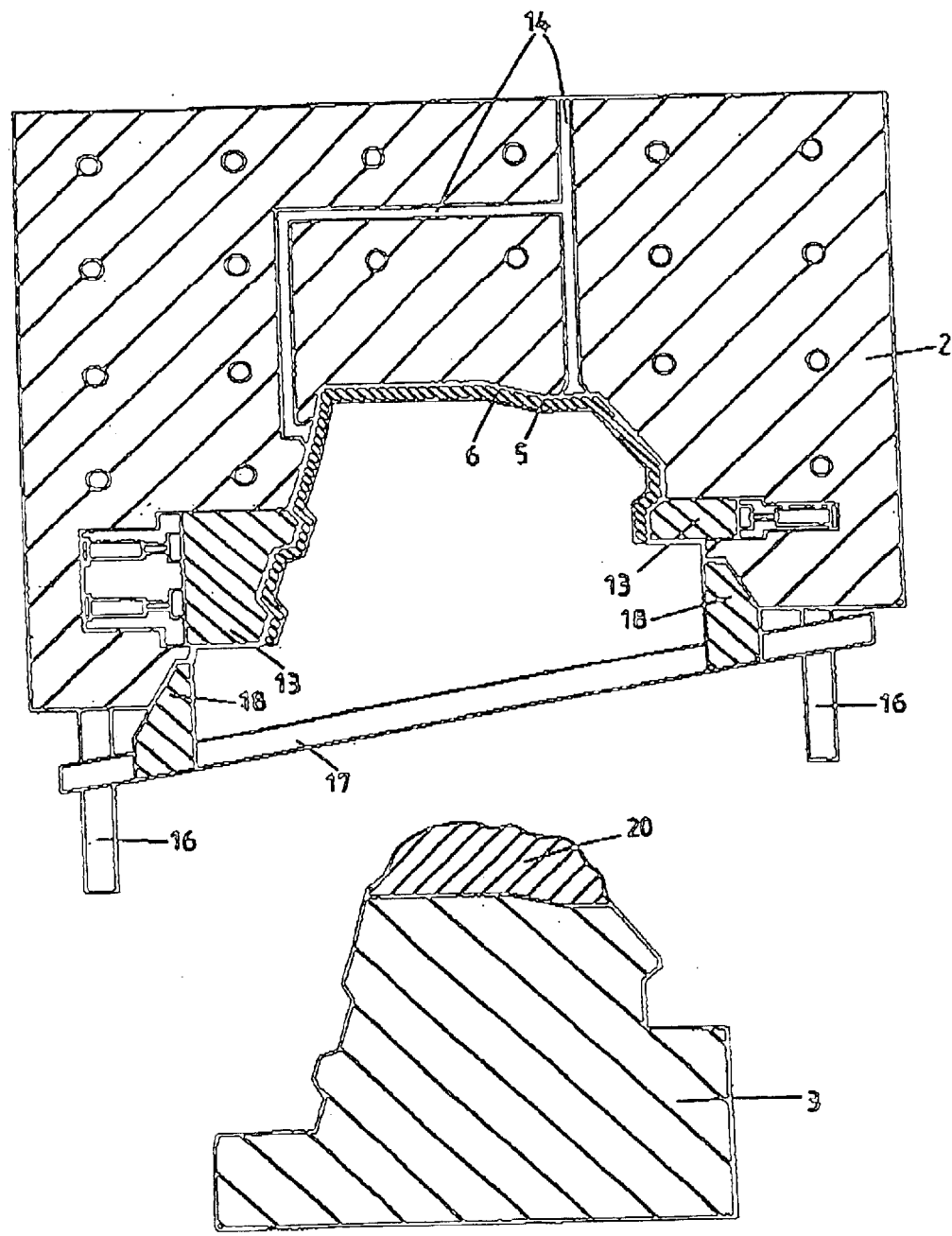
Figure 7:
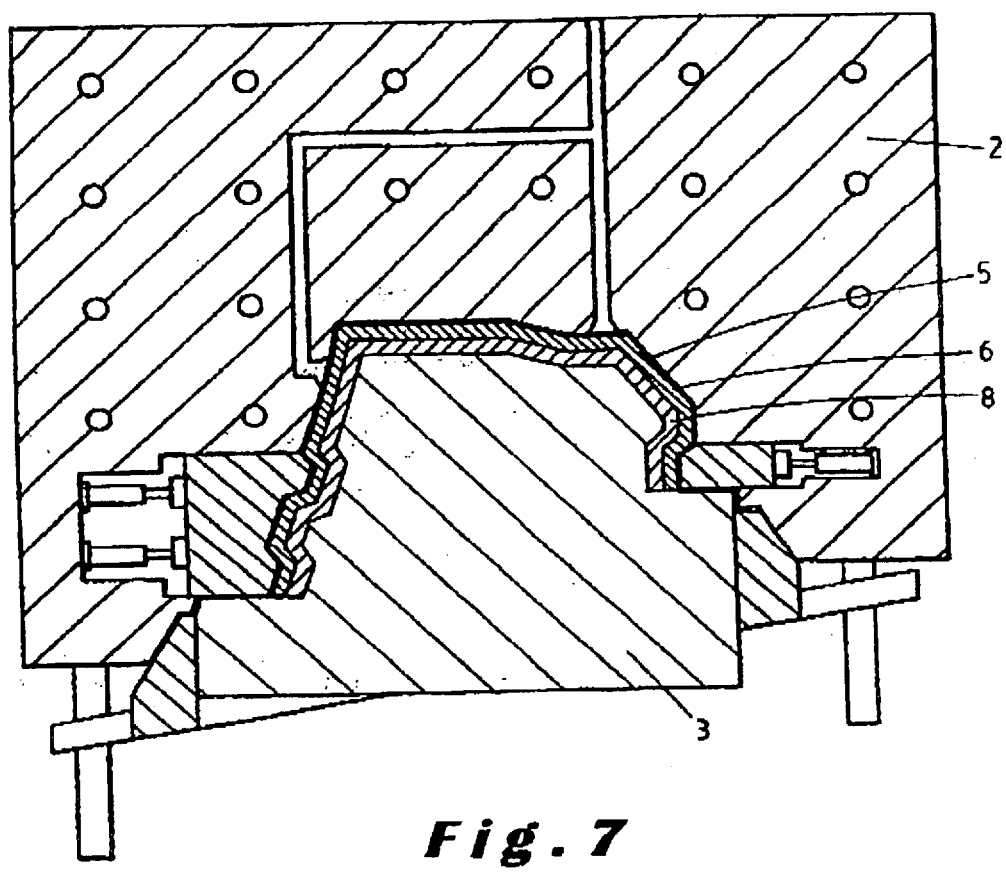

In a fourth step, also illustrated in FIG. 6, a slice 20 of ABS/PC (Bayblend T44 of Bayer) was laid down onto the lower mould part 3 and, in a fifth step, the mould 2,3 was closed (see FIG. 7). In this fifth step, the slice of thermoplastic material was homogeneously spread in the mould cavity by the pressure exerted thereon. The thermoplastic ABS/PC material was laid down at a temperature of 260° C. in a slice having a width of 10 cm. Closing of the press was done in three steps:

- at full speed until the mould parts 2, 3 were 8 mm apart;
- at 10 mm/sec when closing the mould from 8 to 7 mm opening and
- at 3 mm/sec when closing the mould further from 7 to 0 mm opening.

After having closed the mould completely, the following successive back pressures were maintained:

- 70 tons during 2 sec
- 50 tons during 3 sec
- 30 tons during 5 sec.

During the subsequent cooling phase of 50 seconds, no additional pressure was exerted onto the mould.

The multi-layered moulded part produced in this example had a total surface of about 14 dm². The leather texture on the outer side of the skin layer showed no visual defects and there was a good adherence between the different layers.

EXAMPLE 5

Example 4 was repeated without providing a foam layer 6 between the back of the skin 5 and the rigid carrier 8. In this example also, the leather texture on the outer side of the skin layer showed no visible defects notwithstanding the fact that this skin layer was not shielded off from the injected thermoplastic material by an insulating foam layer and notwithstanding the fact that the skin layer was transferred to a pressure mould which showed no superficial texture. Moreover, there was obtained a strong adhesion between the polyurethane skin layer and the ABS/PC thermoplastic synthetic carrier.

From the above description, it will be clear that the invention is in no way limited to the hereabove described embodiments but that many modifications can be considered within the scope of the invention as defined in the appended claims. In particular, one could consider admixing some other materials into the different layers such as for example reinforcing fibers or adding additional reinforcing layers, especially a glass fiber mat between the skin layer and the rigid carrier.

What is claimed is:

1. A method for manufacturing a multi-layered moulded synthetic part comprising at least a preformed elastomeric moulded skin and a moulded carrier of a thermoplastic material, which method comprises the steps of:
   a) moulding said preformed elastomeric moulded skin, and
   b) applying the thermoplastic material for the carrier in molten state in a mould containing the preformed elastomeric moulded skin and moulding said thermoplastic material in said mould, in molten state, to the back of said moulded skin,
   characterized in that said moulded skin is made of a thermosetting synthetic material,
   and further characterized in that the thermoplastic material for the carrier is moulded to the back of the skin according to an injection pressure moulding process in said mould which is only partially closed before the thermoplastic material is injected therein in molten state and which is further closed during and/or after the injection of the thermoplastic material so that a pressure is exerted by the mould onto the molten thermoplastic material.

2. A method for manufacturing a multi-layered moulded synthetic part comprising at least a preformed elastomeric moulded skin and a moulded carrier of a thermoplastic material, which method comprises the steps of:
   a) moulding said preformed elastomeric moulded skin, and
   b) applying the thermoplastic material for the carrier in molten state in a mould containing the preformed elastomeric moulded skin and moulding said thermoplastic material in said mould, in molten state, to the back of said moulded skin,
   characterized in that said moulded skin is made of a thermosetting synthetic material,
   and further characterized in that the thermoplastic material for the carrier is moulded to the back of the skin according to a low pressure moulding process in said mould wherein, before closing it, the thermoplastic material is laid down in molten state in the mould and, after having applied this thermoplastic material, the mould is closed so that a pressure is exerted by the mould onto the molten thermoplastic material.

3. A method according to claim 1 or 2, characterized in that said thermosetting material is a polyurethane material.

4. A method according to claim 1 or 2, characterized in that said preformed skin is made by a spray, a RIM or a slush moulding process starting from a reaction mixture which is allowed to cure to produce the preformed skin.

5. A method according to claim 1, characterized in that after having applied the thermoplastic material in said mould, this mould is closed in such a manner that the pressure exerted by the mould on the molten thermoplastic material is situated between 1 and 350 kg/cm².

6. A method according to claim 1, characterized in that said mould is closed within a closing time shorter than 15 seconds.

7. A method according to claim 1 or 2, characterized in that, before moulding the thermoplastic material for the carrier to the back of the skin, a foam backing layer is applied against the back of the skin.

8. A method according to claim 7, characterized in that said foam backing layer is sprayed against the skin or is applied thereto in a mould according to a RIM process.

9. A method according to 1 or 2, characterized in that said skin is moulded against a mould surface which is either situated in the mould wherein the thermoplastic carrier is moulded or which is transferred thereto after having moulded the skin on this mould surface.

10. A method according to claim 1 or 2, characterized in that said skin is moulded against a first mould surface and is transferred from this first mould surface to a mould surface of the mould wherein the thermoplastic carrier is moulded.

11. A method according to claim 10, characterized in that said first mould surface shows a superficial texture in order to produce a grained skin.

12. A method according to claim 11, characterized in that the mould surface of the mould to which the moulded skin is transferred is free of any superficial texture.

13. A method according to claim 10, characterized in that the mould surface of the mould to which the moulded skin is transferred shows a superficial texture which is, as a result of the pressure and heat applied to the skin during the moulding process of the thermoplastic carrier, transmitted thereto in order to produce a grained skin.

14. A method according to 1 or 2, characterized in that the thermoplastic material from which the carrier is made is selected from the group consisting of polypropylene (PP), polycarbonate (PC), acrylnitril-butadiene-styrol (ABS), ABS blends, acrylester-styrol-acrylInitril (ASA), polystyrol (PS) and thermoplastic polyurethane (TPU).

15. A method according to claim 2, characterized in that after having applied the thermoplastic material in said mould, this mould is closed in such a manner that the pressure exerted by the mould on the molten thermoplastic material is situated between 1 and 350 kg/cm².

16. A method according to claim 2, characterized in that said mould is closed within a closing time shorter than 15 seconds.

17. A method according to claim 15, characterized in that said mould is closed in such a manner that the pressure exerted by the mould on the molten thermoplastic material is situated between 10 and 80 kg/cm².

18. A method according to claim 5, characterized in that said mould is closed in such a manner that the pressure exerted by the mould on the molten thermoplastic material is situated between 10 and 80 kg/cm$^2$.

19. A method according to claim 1 or 2, characterized in that the thermoplastic material from which the carrier is made is selected from the group consisting of polycarbonate (PC), acrylnitril-butadiene-styrol (ABS), ABS blends, acrylester-styrol-acrylnitril (ASA), polystryrol (PS) and thermoplastic polyurethane (TPU).

20. A method according to claim 19, characterized in that the thermoplastic material from which the carrier is made is selected from the group consisting of PC, ABS and ABS blends.

* * * * *